United States Patent
Zhang et al.

(10) Patent No.: US 12,531,620 B2
(45) Date of Patent: Jan. 20, 2026

(54) SYSTEMS, METHODS, AND DEVICES FOR ENHANCED BEAM SELECTION

(71) Applicant: Apple Inc., Cupertino, CA (US)

(72) Inventors: Yushu Zhang, Beijing (CN); Huaning Niu, San Jose, CA (US); Haitong Sun, Cupertino, CA (US); Qiming Li, Beijing (CN); Weidong Yang, San Diego, CA (US); Jie Cui, San Diego, CA (US); Dawei Zhang, Saratoga, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 18/178,174

(22) Filed: Mar. 3, 2023

(65) Prior Publication Data
US 2023/0318682 A1    Oct. 5, 2023

Related U.S. Application Data

(60) Provisional application No. 63/327,083, filed on Apr. 4, 2022.

(51) Int. Cl.
*H04B 7/06*    (2006.01)
*H04L 5/00*    (2006.01)

(52) U.S. Cl.
CPC ......... *H04B 7/0695* (2013.01); *H04B 7/0617* (2013.01); *H04L 5/0051* (2013.01)

(58) Field of Classification Search
CPC .... H04B 7/0617; H04B 7/0695; H04L 5/0051

USPC ........................................................ 375/267
See application file for complete search history.

(56) References Cited

U.S. PATENT DOCUMENTS

| | | | |
|---|---|---|---|
| 10,925,062 B2 | 2/2021 | Liu et al. | |
| 2018/0331727 A1* | 11/2018 | John Wilson | ........ H04B 7/0413 |
| 2020/0322893 A1* | 10/2020 | Yao | ........ H04W 52/18 |
| 2021/0013952 A1* | 1/2021 | Tumula | ........ H04B 7/028 |

FOREIGN PATENT DOCUMENTS

EP        3103200 B1    4/2021

OTHER PUBLICATIONS

5G; NR; Physical layer procedures for data; (3GPP TS 38.214 version 16.5.0 Release 16); ETSI TS 138 214 V16.5.0; Apr. 2021.
PCT Search Report dated Jul. 7, 2023, in connection with PCT Application No. PCT/US2023/017082.

(Continued)

*Primary Examiner* — Leila Malek
(74) *Attorney, Agent, or Firm* — Eschweiler & Potashnik, LLC

(57) ABSTRACT

Techniques, described herein, include solutions for enabling a base station and user equipment (UE) to use low beam (e.g., frequency range 1 (FR1)) communications to determine a line-of-sight (LOS) status of a beam between the base station and the UE, and use the LOS status to establish or maintain a link or channel using a high beam (e.g., frequency range 2 (FR2)).

20 Claims, 11 Drawing Sheets

(56) References Cited

OTHER PUBLICATIONS

Moderator (Ericsson): "FL summary #2 for AI 8.5.3 Accuracy improvements for DL-AoD positioning", 3GPP Draft; R1-2110500, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 11, 2021-Oct. 19, 2021; Oct. 13, 2021 (Oct. 13, 2021), XP052060629, Retrieved from the Internet: URL:https://ftp.3gpp.org/tsg_ran/WG1_RL1/TSGR1_106b-e/Docs/R1-2110500.zip R1-2110500 FL summary 2 for FL-AoD.docx [retrieved on Oct. 13, 2021] pp. 47-49.
International Preliminary Report on Patentability issued on Oct. 8, 2024 in connection with Application No. PCT/US2023/017082.

* cited by examiner

IE CSI-reportConfig

```
reportQuantity               CHOICE {
    none                         NULL,
    cri-RI-PMI-CQI               NULL,
    cri-RI-i1                    NULL,
    cri-RI-i1-CQ                 SEQUENCE {
        pdsch-BundleSizeForCSI       ENUMERATED {n2, n4} OPTIONAL -- Need S
    },
    cri-RI-CQI                   NULL,
    cri-RSRP                     NULL,
    ssb-Index-RSRP               NULL,
    cri-RI-LI-PMI-CQI            NULL,
    cri-LOS-PMI                  NULL,
},
```

*FIG. 4*

SYSTEMS, METHODS, AND DEVICES FOR ENHANCED BEAM SELECTION

REFERENCE TO RELATED APPLICATIONS

This application claims the benefit of U.S. Provisional Application No. 63/327,083, filed on Apr. 4, 2022, the contents of which are hereby incorporated by reference in their entirety

FIELD

This disclosure relates to wireless communication networks including techniques for selecting beams in a wireless communication network.

BACKGROUND

As the number of mobile devices within wireless networks, and the demand for mobile data traffic, continue to increase, changes are made to system requirements and architectures to better address current and anticipated demands. For example, some wireless communication networks may be developed to implement fifth generation (5G) or new radio (NR) technology, sixth generation (6G) technology, and so on. An aspect of such technology includes how wireless devices identify and select beams for wireless communications between one another.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 4 is a diagram of an example of an information element (IE) for enhanced beam selection according to one or more implementations described herein

DETAILED DESCRIPTION

Figure 1:
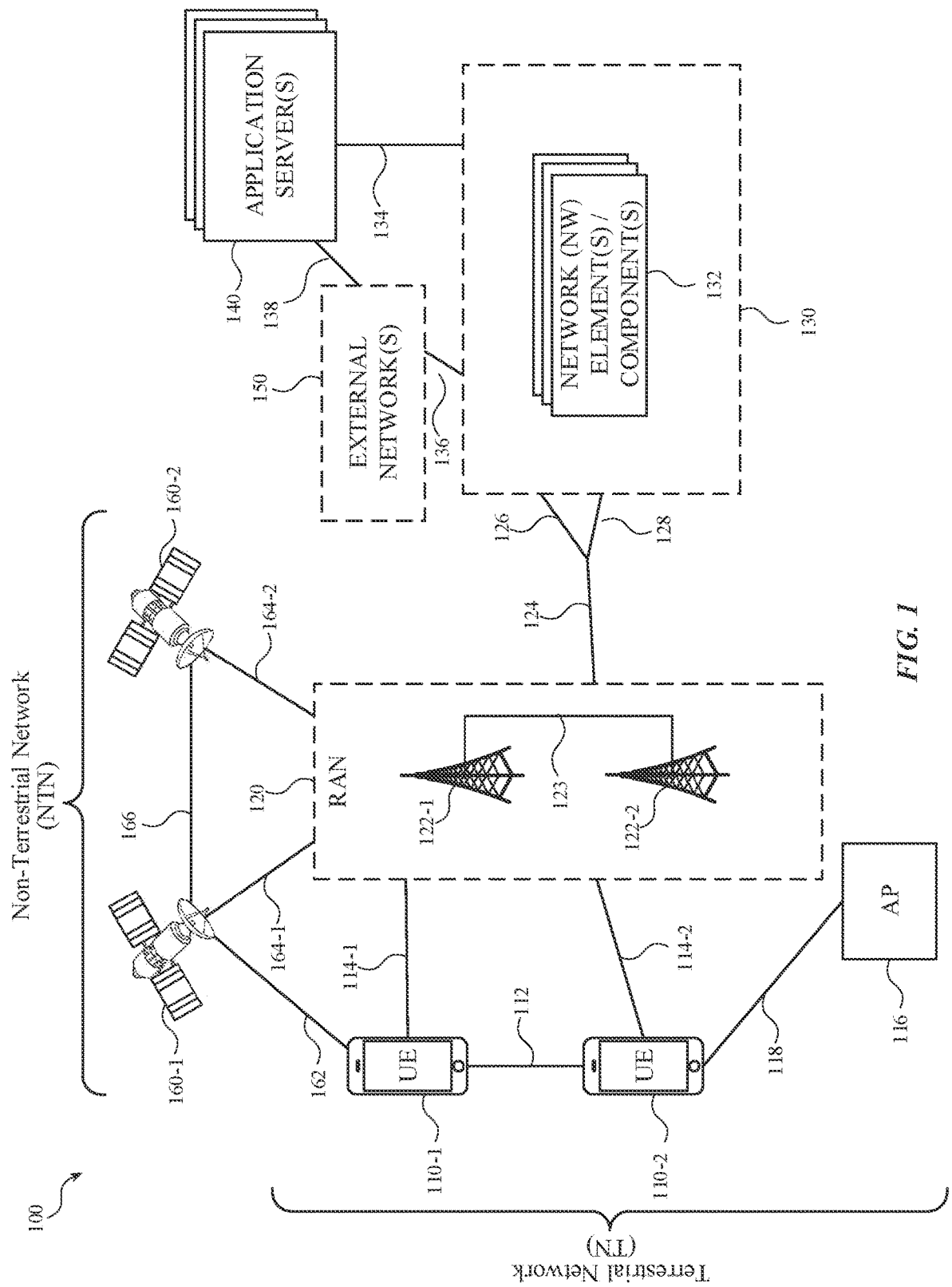
FIG. 1 is a diagram of an example network according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Telecommunication networks may include user equipment (UEs) capable of communicating with base stations and other network nodes. UEs and base stations may implement various techniques for establishing and maintaining connectivity. An example of such techniques may include beamforming, which may include a signaling procedure used for directional signal transmission or reception between wireless devices. The directionality of beamforming may involve coordinating elements in an antenna array so that signals at particular angles experience constructive interference while others experience destructive interference. Beamforming can be implemented by both the transmitting device and receiving device in order to achieve spatial, or location based, selectivity and connectivity. Additionally, multiple beams may be established between wireless devices.

A base station and UE may implement beam selection to determine which beams to use for communicating with one another. This may include beam measurement, beam reporting, and beam indication. Beam measurement may involve a base station providing a UE with synchronization signal blocks (SSBs) and/or channel state information reference signal (CSI-RS) to enable the UE to measure a signal strength or quality of multiple reference signals (e.g., transmission (Tx) beams). The measurement may include a layer 1 reference signal receiving power (L1-RSRP), a layer 1 signal to interference plus noise ratio (L1-SINR), etc. The UE may also try, and measure the performance of, different reception (Rx) beams to identify which Rx beams correspond to each transmission (Tx) beam. Additionally, UE may communicate (or report) the beam measurements to the base station. Upon receiving beam measurements from the UE, the base station may use the beam measurements to select one or more beams for communicating with the UE and indicate the selected beams to the UE via media access control (MAC) control elements (CEs) and/or downlink (DL) control information (DCI). The base station and UE may then use the selected beams to communicate with one another.

Channel state information (CSI) may include information describing, or indicating, the quality of a channel. For example, a UE may be configured to measure one or more characteristics of a particular channel between a base station and the UE, may generate CSI regarding the channel, and may report the CSI to the base station. The CSI may be based on an SSB and/or CSI-RS from the base station. Additionally, the UE may be configured to determine and/or report CSI on a periodic, aperiodic, persistent, or semi-persistent basis. The CSI may include channel quality information (CQI), a precoder matrix indicator (PMI), a CSI-RS resource indicator (CSI-RS), a synchronization signal (SS) or physical broadcast channel (PBCH) resource block indicator (SSBRI), a layer indicator (LI), a rank indicator (RI), a L1-RSRP, and/or one or more additional or alternative types of information. A PMI, as described herein, may be measured or determined by a UE based on a codebook. A codebook may include a mathematical or logical matrix configured to enable a wireless device (e.g., a UE) to transform data from a channel (e.g., a physical downlink shared channel (PDSCH)) to another set of data that maps to an antenna array or ports of an antenna array. In some implementations, the codebook may cause, or enable, the device to select a particular beam (e.g., an appropriate beam) from a variety of beams (e.g., a set of beams that may also include less appropriate beams).

Beamforming and beam selection may increase a maximum number of wireless devices (and/or wireless carriers) that may use a given wireless spectrum because of the directionality, or location-specific, nature of beamforming. Indeed, as each beam becomes spatially narrower, the number of potential beams may increase (e.g., into the hundreds of beams or more). And while doing so may increase the wireless devices and/or carriers of a given spectrum, increasing the number of beams, or potential beams, may also increase the amount of signaling, signal processing, and battery usage involved in beam selection.

For instance, carrier aggregation (CA) may involve a scenario in which multiple sections of the wireless spectrum are used to enable communications between a UE and one or more base stations. As an example, a UE may coordinate with one base station, operating as a primary cell (PCell) for the UE, and one or more other base stations, operating as secondary cells (SCells) for the UE. Enabling communications between each base station and the UE may include multiple beam selection procedures, which may increase the amount of signaling, signal processing, and battery usage involved in beam selection.

Further, such scenarios may involve both low band and high band communications. For example, a PCell may communicate with the UE using low band communications, while SCells may communicate with the UE using high band communications. Low band communications may correspond to lower frequency ranges than those of high band communications. In some implementations, low band communications may use frequency range 1 (FR1), and high band communications may use frequency range 2 (FR2). FR1 may include a frequency range between 0.410 and 7.125 gigahertz (Ghz), and FR2 may include a frequency range between 24.25 and 52.6 Ghz (e.g., a millimeter wave range). However, the terms "low band" and "high band", as used herein, may include additional or alternative frequency ranges than FR1 and/or FR2. Additionally, high band communications may include a shorter range but higher available bandwidth than low band communications. High band communications (e.g., high band beam selection) may be more power intensive on the battery life of a UE. As such, as the number of potential beams, devices (e.g., transmission and reception points (TRPs)), and/or high band communications increase, the resource cost (e.g., signal transmission and reception, signal processing, battery life, etc.) for beamforming and beam selection may increase. This may be particularly relevant in some scenarios since a UE may connect to a network via a single base station (e.g., TRP) and a single beam; via multiple base stations (e.g., TRPs) and a single beam for each base station; via a single base station (e.g., TRP) and multiple beams; or via multiple base stations (e.g., TRPs) and multiple beams for each base station (e.g., TRP).

The techniques described herein may provide enhanced beam selection solution via more efficient beam selection solutions. For example, one or more of the techniques described herein may enable the use of low band communications to enable high band beam selection. In some implementations, a base station may use a low band to communicate downlink (DL) reference signals (RSs) to UE, and UE may use the RSs to measure a LOS path and precoder matrix indicator (PMI). The UE may provide a LOS status and PMI report based on the measurements, and the base station may use the LOS status and PMI report to determine a LOS path between the UE and base station. The base station may also provide the UE with a beam indication to the UE based on a reported SSB/CSI-RS for high band communications.

In some implementations, the base station may configure the UE to provide low band uplink (UL) sounding reference signals (SRSs) for LOS estimation. The base station may determine a LOS path between the base station and UE based on the SRSs and may provide the UE with a beam indication based on a reported SSB/CSI-RS for high band communications. In some implementations, a base station may use low band communications to provide UE with Tx direction information for SSB/CSI-RSs and corresponding DL RSs. The UE may determine a LOS path based on the Tx direction information and RSs and may use low band communications to report the a preferred beam based on the LOS path, which may in turn be used to establish and/or maintain high band communications between the base station and UE. Accordingly, one or more of the techniques described herein may provide enhanced beam selection solutions by enabling a high band link to be established and/or maintained based on low band communications. These operations and other features and benefits of the techniques described herein are discussed below in greater detail with reference to the figures. A low band may be referred to herein as a first frequency band. A high band may be referred to herein as a second frequency band.

FIG. 1 is an example network 100 according to one or more implementations described herein. Example network 100 may include UEs 110-1, 110-2, etc. (referred to collectively as "UEs 110" and individually as "UE 110"), a radio access network (RAN) 120, a core network (CN) 130, application servers 140, external networks 150, and satellites 160-1, 160-2, etc. (referred to collectively as "satellites 160" and individually as "satellite 160"). As shown, network 100 may include a non-terrestrial network (NTN) comprising one or more satellites 160 (e.g., of a global navigation satellite system (GNSS)) in communication with UEs 110 and RAN 120.

The systems and devices of example network 100 may operate in accordance with one or more communication standards, such as 2nd generation (2G), 3rd generation (3G), 4th generation (4G) (e.g., long-term evolution (LTE)), and/or 5th generation (5G) (e.g., new radio (NR)) communication standards of the 3rd generation partnership project (3GPP). Additionally, or alternatively, one or more of the systems and devices of example network 100 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 110 may include smartphones (e.g., handheld touchscreen mobile computing devices connectable to one or more wireless communication networks). Additionally, or alternatively, UEs 110 may include other types of mobile or non-mobile computing devices capable of wireless communications, such as personal data assistants (PDAs), pagers, laptop computers, desktop computers, wireless handsets, etc. In some implementations, UEs 110 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 110 may communicate and establish a connection with one or more other UEs 110 via one or more wireless channels 112, each of which may comprise a physical communications interface/layer. The connection may include an M2M connection, MTC connection, D2D connection, etc. In some implementations, UEs 110 may be configured to discover one another, negotiate wireless resources between one another, and establish connections between one another, without intervention or communications involving RAN node 122 or another type of network node. In some implementations, discovery, authentication, resource negotiation, registration, etc., may involve communications with RAN node 122 or another type of network node.

UEs 110 may communicate and establish a connection with (e.g., be communicatively coupled) with RAN 120, which may involve one or more wireless channels 114-1 and 114-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 122-1 and 122-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 130. Additionally, at least one of the MN or the SN may be operated with shared spectrum channel access, and functions specified for UE 110 can be used for an integrated access and backhaul mobile termination (IAB-MT). Similar for UE 101, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 122.

As shown, UE 110 may also, or alternatively, connect to access point (AP) 116 via connection interface 118, which may include an air interface enabling UE 110 to communicatively couple with AP 116. AP 116 may comprise a wireless local area network (WLAN), WLAN node, WLAN termination point, etc. The connection 1207 may comprise a local wireless connection, such as a connection consistent with any IEEE 702.11 protocol, and AP 116 may comprise a wireless fidelity (Wi-Fi®) router or other AP. While not explicitly depicted in FIG. 1, AP 116 may be connected to another network (e.g., the Internet) without connecting to RAN 120 or CN 130. In some scenarios, UE 110, RAN 120, and AP 116 may be configured to utilize LTE-WLAN aggregation (LWA) techniques or LTE WLAN radio level integration with IPsec tunnel (LWIP) techniques. LWA may involve UE 110 in RRC_CONNECTED being configured by RAN 120 to utilize radio resources of LTE and WLAN. LWIP may involve UE 110 using WLAN radio resources (e.g., connection interface 118) via IPsec protocol tunneling to authenticate and encrypt packets (e.g., Internet Protocol (IP) packets) communicated via connection interface 118. IPsec tunneling may include encapsulating the entirety of original IP packets and adding a new packet header, thereby protecting the original header of the IP packets.

RAN 120 may include one or more RAN nodes 122-1 and 122-2 (referred to collectively as RAN nodes 122, and individually as RAN node 122) that enable channels 114-1 and 114-2 to be established between UEs 110 and RAN 120. RAN nodes 122 may include network access points configured to provide radio baseband functions for data and/or voice connectivity between users and the network based on one or more of the communication technologies described herein (e.g., 2G, 3G, 4G, 5G, WiFi, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 may include a roadside unit (RSU), a transmission reception point (TRxP or TRP), and one or more other types of ground stations (e.g., terrestrial access points). In some scenarios, RAN node 122 may be a dedicated physical device, such as a macrocell base station, and/or a low power (LP) base station for providing femtocells, picocells or the like having smaller coverage areas, smaller user capacity, or higher bandwidth compared to macrocells. As described below, in some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and also to implementation where the base station, RAN node 122, etc., is a non-terrestrial network node (e.g., satellite 160).

Some or all of RAN nodes 122, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 122; a media access control (MAC)/physical (PHY) layer split wherein RRC, PDCP, radio link control (RLC), and MAC layers may be operated by the CRAN/vBBUP and the PHY layer may be operated by individual RAN nodes 122; or a "lower PHY" split wherein RRC, PDCP, RLC, MAC layers and upper portions of the PHY layer may be operated by the CRAN/vBBUP and lower portions of the PHY layer may be operated by individual RAN nodes 122. This virtualized framework may allow freed-up processor cores of RAN nodes 122 to perform or execute other virtualized applications.

In some implementations, an individual RAN node 122 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 120 or by a server pool (e.g., a group of servers configured to share resources) in a similar manner as the CRAN/vBBUP. Additionally, or alternatively, one or more of RAN nodes 122 may be next generation eNBs (i.e., gNBs) that may provide evolved universal terrestrial radio access (E-UTRA) user plane and control plane protocol terminations toward UEs 110, and that may be connected to a 5G core network (5GC) 130 via an NG interface.

Any of the RAN nodes 122 may terminate an air interface protocol and may be the first point of contact for UEs 110. In some implementations, any of the RAN nodes 122 may fulfill various logical functions for the RAN 120 including, but not limited to, radio network controller (RNC) functions such as radio bearer management, uplink and downlink dynamic radio resource management and data packet scheduling, and mobility management. UEs 110 may be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 122 to UEs 110, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 122 may be configured to wirelessly communicate with UEs 110, and/or one another, over a licensed medium (also referred to as the "licensed spectrum" and/or the "licensed band"), an unlicensed shared medium (also referred to as the "unlicensed spectrum" and/or the "unlicensed band"), or combination thereof. In an example, a licensed spectrum may include channels that operate in the frequency range of approximately 400 MHz to approximately 3.8 GHz, whereas the unlicensed spectrum may include the 5 GHz band. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 110 and the RAN nodes 122 may operate using licensed assisted access (LAA), eLAA, and/or feLAA mechanisms. In these implementations, UEs 110 and the RAN nodes 122 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The LAA mechanisms may be built upon carrier aggregation (CA) technologies of LTE-Advanced systems. In CA, each aggregated carrier is referred to as a component carrier (CC). In some cases, individual CCs may have a different bandwidth than other CCs. In time division duplex (TDD) systems, the number of CCs as well as the bandwidths of each CC may be the same for DL and UL. CA also comprises individual serving cells to provide individual CCs. The coverage of the serving cells may differ, for example, because CCs on different frequency bands will experience different pathloss. A primary service cell or PCell may provide a primary component carrier (PCC) for both UL and DL and may handle RRC and non-access stratum (NAS) related activities. The other serving cells are referred to as SCells, and each SCell may provide an individual secondary component carrier (SCC) for both UL and DL. The SCCs may be added and removed as required, while changing the PCC may require UE 110 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe. To operate in the unlicensed spectrum, UEs 110 and the RAN nodes 122 may also operate using stand-alone unlicensed operation where the UE may be configured with a PCell, in addition to any SCells, in unlicensed spectrum.

The PDSCH may carry user data and higher layer signaling to UEs 110. The physical downlink control channel (PDCCH) may carry information about the transport format and resource allocations related to the PDSCH channel, among other things. The PDCCH may also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) may be performed at any of the RAN nodes 122 based on channel quality information fed back from any of UEs 110. The downlink resource assignment information may be sent on the PDCCH used for (e.g., assigned to) each of UEs 110.

The PDCCH uses control channel elements (CCEs) to convey the control information, wherein a number of CCEs (e.g., 6 or the like) may consists of a resource element groups (REGs), where a REG is defined as a physical resource block (PRB) in an OFDM symbol. Before being mapped to resource elements, the PDCCH complex-valued symbols may first be organized into quadruplets, which may then be permuted using a sub-block interleaver for rate matching, for example. Each PDCCH may be transmitted using one or more of these CCEs, where each CCE may correspond to nine sets of four physical resource elements known as REGs. Four quadrature phase shift keying (QPSK) symbols may be mapped to each REG. The PDCCH may be transmitted using one or more CCEs, depending on the size of the DCI and the channel condition. There may be four or more different PDCCH formats defined in LTE with different numbers of CCEs (e.g., aggregation level, L=1, 2, 4, 8, or 16).

Some implementations may use concepts for resource allocation for control channel information that are an extension of the above-described concepts. For example, some implementations may utilize an extended (E)-PDCCH that uses PDSCH resources for control information transmission. The EPDCCH may be transmitted using one or more ECCEs. Similar to the above, each ECCE may correspond to nine sets of four physical resource elements known as an EREGs. An ECCE may have other numbers of EREGs in some situations.

The RAN nodes 122 may be configured to communicate with one another via interface 123. In implementations where the system is an LTE system, interface 123 may be an X2 interface. In NR systems, interface 123 may be an Xn interface. The X2 interface may be defined between two or more RAN nodes 122 (e.g., two or more eNBs/gNBs or a combination thereof) that connect to evolved packet core (EPC) or CN 130, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 120 may be connected (e.g., communicatively coupled) to CN 130. CN 130 may comprise a plurality of network elements 132, which are configured to offer various data and telecommunications services to customers/subscribers (e.g., users of UEs 110) who are connected to the CN 130 via the RAN 120. In some implementations, CN 130 may include an evolved packet core (EPC), a 5G CN, and/or one or more additional or alternative types of CNs. The components of the CN 130 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 130 may be referred to as a network slice, and a logical instantiation of a portion of the CN 130 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 130, application servers 140, and external networks 150 may be connected to one another via interfaces 134, 136, and 138, which may include IP network interfaces. Application servers 140 may include one or more server devices or network elements (e.g., virtual network functions (VNFs) offering applications that use IP bearer resources with CM 130 (e.g., universal mobile telecommunications system packet services (UMTS PS) domain, LTE PS data services, etc.). Application servers 140 may also, or alternatively, be configured to support one or more communication services (e.g., voice over IP (VoIP sessions, push-to-talk (PTT) sessions, group communication sessions, social networking services, etc.) for UEs 110 via the CN 130. Similarly, external networks 150 may include one or more of a variety of networks, including the Internet, thereby providing the mobile communication network and UEs 110 of the network access to a variety of additional services, information, interconnectivity, and other network features.

As shown, example network 100 may include an NTN that may comprise one or more satellites 160-1 and 160-2 (collectively, "satellites 160"). Satellites 160 may be in communication with UEs 110 via service link or wireless interface 162 and/or RAN 120 via feeder links or wireless interfaces 164 (depicted individually as 164-1 and 164). In some implementations, satellite 160 may operate as a passive or transparent network relay node regarding communications between UE 110 and the terrestrial network (e.g., RAN 120). In some implementations, satellite 160 may operate as an active or regenerative network node such that satellite 160 may operate as a base station to UEs 110 (e.g., as a gNB of RAN 120) regarding communications between UE 110 and RAN 120. In some implementations, satellites 160 may communicate with one another via a direct wireless interface (e.g., 166) or an indirect wireless interface (e.g., via RAN 120 using interfaces 164-1 and 164-2).

Additionally, or alternatively, satellite 160 may include a GEO satellite, LEO satellite, or another type of satellite.

Satellite 160 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 160 may operate as bases stations (e.g., RAN nodes 122) with respect to UEs 110. As such, references herein to a base station, RAN node 122, etc., may involve implementations where the base station, RAN node 122, etc., is a terrestrial network node and implementation, where the base station, RAN node 122, etc., is a non-terrestrial network node (e.g., satellite 160). As described herein, UE 110 and base station 122 may communicate with one another, via interface 114, to enable enhanced power saving techniques.

Figure 2:
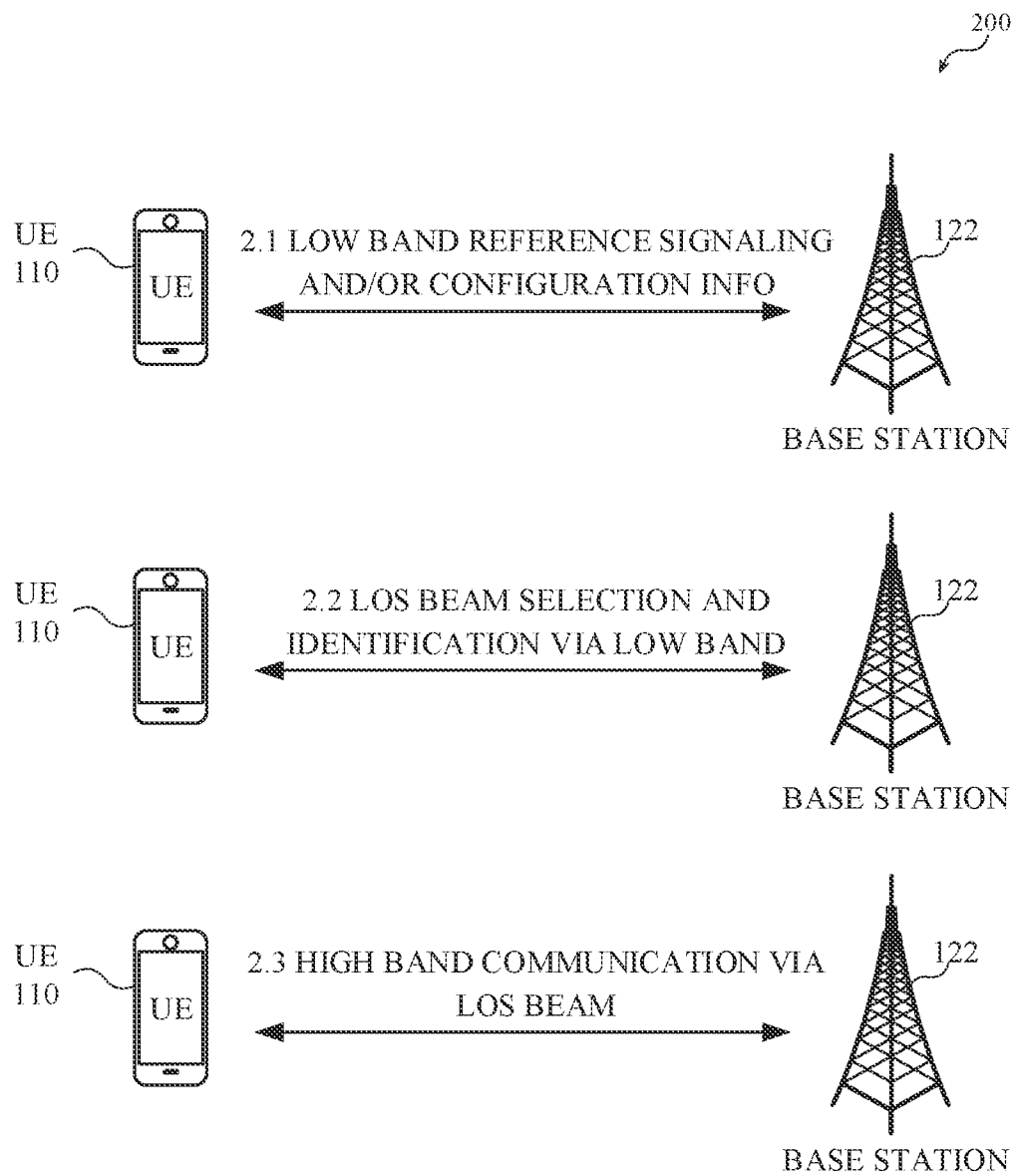
FIG. 2 is a diagram of an example overview of enhanced beam selection according to one or more implementations described herein.

FIG. 2 is a diagram of an example overview 200 of enhanced beam selection according to one or more implementations described herein. As shown, base station 122 and UE 110 may communicate reference signaling information via a low band (at 2.1). In some implementations, the reference signaling may include base station 122 sending DL RSs to UE 110. In some implementations, the reference signaling may include configuration information for UE 110 to send sounding reference signals (SRSs) to base station 122. In other implementations, the reference signaling may include base station 122 sending, to UE 110, Tx direction information for one or more beams to be measured and/or selected by UE 110. Base station 122 and/or UE 110 may proceed by using low band communications to identify a LOS beam between base station 122 and UE 110 (at 2.2). In some implementations, base station 122 may communicate RSs and UE 110 may determine the LOS beam. In some implementations, UE 110 may communicate RSs (e.g., sounding reference signals (SRSs) and base station 122 may determine the LOS beam. In response to beam identification and selection, UE 110 and base station 122 may proceed by communicating using a high band based on the LOS beam determined via the low band (at 2.3).

Figure 3:
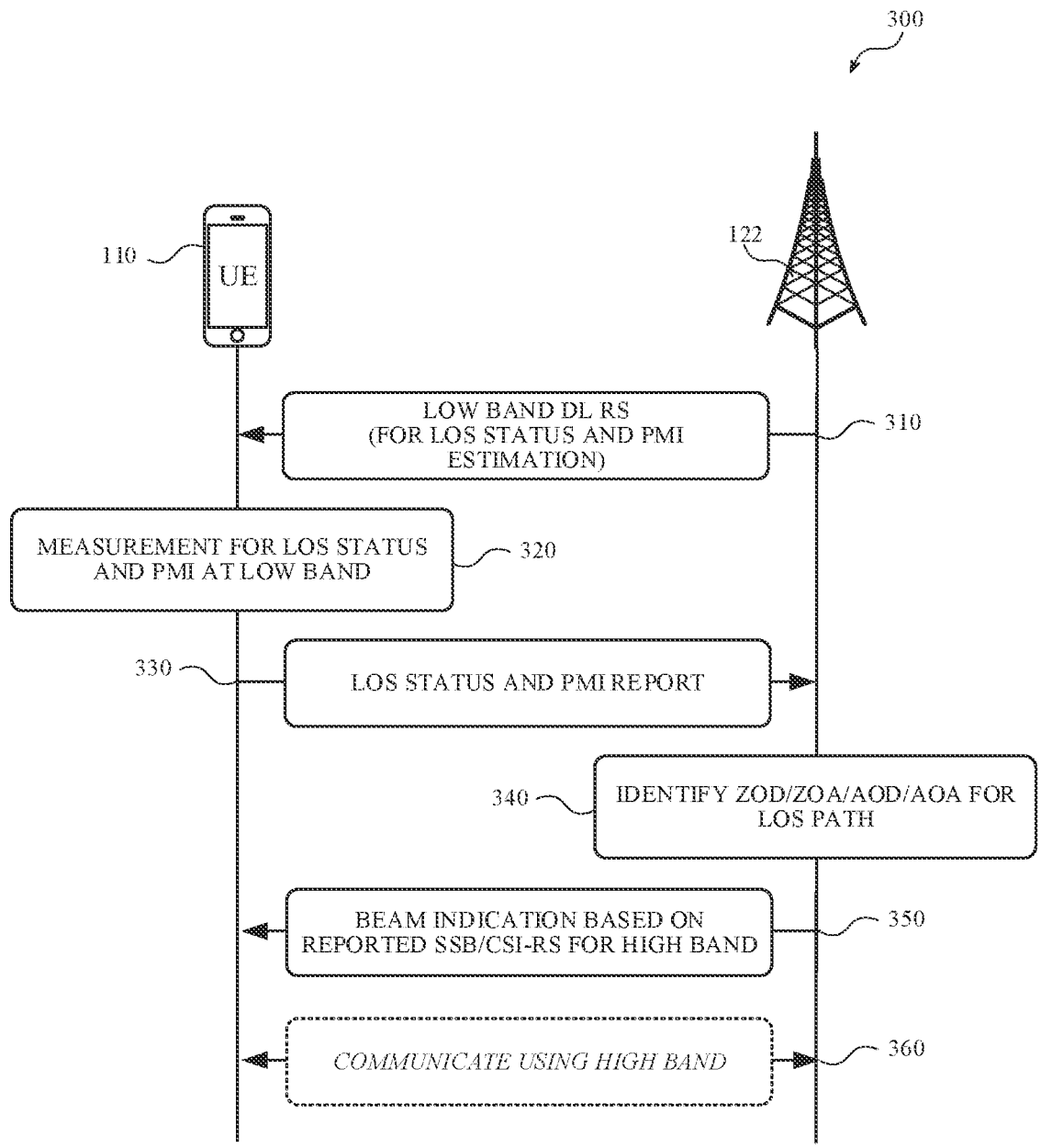
FIG. 3 is a diagram of an example of a process for enhanced beam selection based on channel state information (CSI) according to one or more implementations described herein.

FIG. 3 is a diagram of an example of a process 300 for enhanced beam selection based on CSI according to one or more implementations described herein. Process 300 may be implemented by UE 110 and base station 122. In some implementations, some or all of process 300 may be performed by one or more other systems or devices, including one or more of the devices of FIG. 1. Additionally, process 300 may include one or more fewer, additional, differently ordered and/or arranged operations than those shown in FIG. 3. In some implementations, some or all of the operations of process 300 may be performed independently, successively, simultaneously, etc., of one or more of the other operations of process 300. As such, the techniques described herein are not limited to a number, sequence, arrangement, timing, etc., of the operations or process depicted in FIG. 3.

As shown, base station 122 may communicate a DL RS to UE 110 (at 310). The DL RS may be communicating using a low band (e.g., FR1) and may be configured to enable UE 110 to determine a LOS status (or non-LOS (NLOS) status and PMI estimation. UE 110 may measure the DL RS to determine the LOS status and corresponding PMI (at 320). In some implementations, UE 110 may determine the LOS status at a link level instead of a beam level. Additionally, or alternatively, UE 110 may determine the LOS or NLOS status using time domain channel impulse response (CIR). For LOS, UE 110 may detect a strong channel cluster (e.g., a signal power above a pre-selected threshold), while for NLOS, UE 110 may fail to detect a suitable channel cluster, may detect multiple channel clusters but without a suitably dominate channel cluster, etc. In some implementations, UE 110 may implement machine learning techniques for determining the LOS status (e.g., where the CIR may be an input). UE 110 may also, or alternatively, determine a PMI by scanning rank 1 precoders of a predefined codebook (e.g., precoders defined in Table 5.2.2.2.1-5 in 3GPP TS 38.214, and selecting the one with strongest power).

UE 110 may also, or alternatively, provide base station 122 with information (e.g., a report) of the LOS (or non-LOS) status and corresponding PMI to base station 122 (at 330). In some implementations, UE 110 may do so using a low band. As described herein, receiving, measuring, and reporting the LOS status and PMI estimation using a low band, instead of using a high band (e.g., FR2), may enable UE 110 to conserve batter power.

Base station 122 may identify or determine, based on the LOS status and PMI information to determine a LOS path between base station 122 and UE 110 (at 340). The LOS path, as described herein, may include a LOS beam, and the characteristics corresponding thereto, between base station 122 and UE 110. In some implementations, this may include base station 122 determining an azimuth angle of departure (AoD), azimuth angle of arrival (AoA), zenith angle of departure (ZoD), and/or zenith angle of arrival (ZoA) corresponding to the LOS path. An AoD, AoA, ZoD, and ZoA may each include angular measurements, of departure and arrival, regarding a selected beam between UE 110 and base station 122 (e.g., angular measurements, in a spherical coordinate system, of an angle between a projected vector (e.g., a beam between UE 110 and base station 122) and a reference vector on a reference plane (e.g., a horizontal plane and a vertical plane). Base station 122 may use the AoD, AoA, ZoD, and ZoA to determine the LOS path for the beam. When UE 110 reports to base station 122 a NLOS status, base station 122 may not act and process 300 may conclude (e.g., base station 122 and UE 110 may continue to communicate using low band communications to determine another beam with an LOS status).

Base station 122 may provide UE 110 with a beam indication information based on a reported SSB/CSI-RS for a high band link (at 350). Additionally, or alternatively, base station 122 and UE 110 may proceed by using the beam indication information for communicating via high band communications or a high band link. The high band link may include a high band component carrier (CC) to a pre-established low band carrier between base station 122 and UE 110, and or another base station 122 and UE 110. As such, base station 122 and UE 110 may use low band communications (e.g., FR1) to determine a suitable beam, based on a LOS status, for communicating with one another using high band communications (e.g., FR2), thereby foregoing the resource-intensive process of beam selection using high band communications.

FIG. 4 is a diagram of an example information element (IE) 400 for enhanced beam selection according to one or more implementations described herein. Example IE 400 may be part of a signal, message, data structure, or other type of information, by which one or more aspects of the enhanced beam selection techniques, described herein, may be integrated within one or more existing 3GPP processes, IEs, RRC messages, etc. As such, base station 122 and UE 110 may use example IE 400 to implement one or more of the enhanced beam selection techniques described herein. In other implementations, base station 122 and UE 110 may use one or more additional, alternative, different, or differently arranged IEs. As such, example IE 400 is provided as a non-limiting example of the scope of the techniques described herein.

As shown, example IE 400 may include a CSI-reportConfig IE of the 3GPP. For example, UE 110 may measure a RS from base station 122 and determine a quality and/or channel condition of a link with base station 122 based on the RS. In doing so, UE 110 may determine one or more parameters or characteristics relating to the channel (e.g., CSI) such as the parameters illustrated in FIG. 4. UE 110 may further generate a quality report (e.g., reportQuality) data set, which may include the parameters measured/determined by UE 110. As shown, examples of such parameters may include a cri-RI-PMI-CQI parameter, a cri-RI-i1 parameter, cri-RI-i1-CO parameter, etc. In some implementations, base station 122 may configured UE 110 to provide the LOS status and PMI via configuring UE 110 to do so (e.g., by providing UE 110 with an instructions or indication to do so.

In accordance with one or more of the techniques described herein, the CSI-reportConfig IE may also include a cri-LOS-PMI parameter, which may be used to indicate a LOS/NLOS status to base station 122. The cri-LOS-PMI parameter, or another CSI-reportConfig IE parameter, may also, or alternatively, be used to report a corresponding PMI to base station 122. The PMI may be reported based on a codebook configured by base station 122 or a codebook used by UE 110 for providing other (e.g., related) CSI reports. In some implementations, UE 110 may determine the PMI by measurement, based on rank 1 precoders. A rank 1 precoder may include the precoders for single layer transmission from a predefined codebook (e.g., precoders defined in Table 5.2.2.2.1-5 in 3GPP TS 38.214). As such, UE 110 may report the LOS status and PMI, via a PUCCH and/or PUSCH communication, in a single CSI IE (e.g., CSI-reportConfig IE) or different CSI IEs.

In some implementations base station 122 may configure UE 110 to measure and report a new CSI quality (e.g., the LOS status and PMI) in a manner associated with another CSI report. In one example, new candidate values for reportQuantity may include one or more reporting parameters, such as a cri-RI-PMI-CQI-LOS parameter, cri-RI-i1-LOS parameter, a cri-RI-i1-CQI-LOS parameter, a cri-RI-CQI-LOS parameter, a cri-RI-LI-PMI-CQI-LOS parameter, etc. Additionally, or alternatively, when the CSI is reported in a single CSI part, the LOS status and PMI may be reported in the same part (e.g., IE). When the CSI is reported in two or more CSI parts, the LOS status and PMI may be reported in a first CSI part or a second CSI part (e.g., IE) of the multiple CSI parts. Additionally, or alternatively, when the LOS status is reported, the PMI may be reported when the LOS status is LOS instead of NLOS.

In some implementations, when UE 110 is configured to only report PMI, UE 110 may not report the LOS status. Additionally, or alternatively, UE 110 reporting a default PMI value may indicate (e.g., by implication) a NLOS status. In some implementations, the LOS status and PMI may not be reported based on an existing CSI framework. Instead, the LOS status and PMI may be reported by other means, such as by a MAC CE. Further, if/when UE 110 detects or determines that a beam failure has occurred, UE 110 may trigger a remeasurement and rereporting of an LOS status and PMI. In some implementations, base station 122 may cause UE 110 to trigger a remeasurement and rereporting of a LOS status and PMI by communicating a dedicated scheduling request (SR) to UE 110. If/when a SR is not provided, a contention based random access (CBRA) procedure may be used to trigger such remeasurement and rereport. In some implementations, example IE 400 or another type of IE or data structure may be used by base station 122 to inform UE 110 that the LOS status and/or PMI (and/or another type of information) is to be reported by UE 110.

Figure 5:
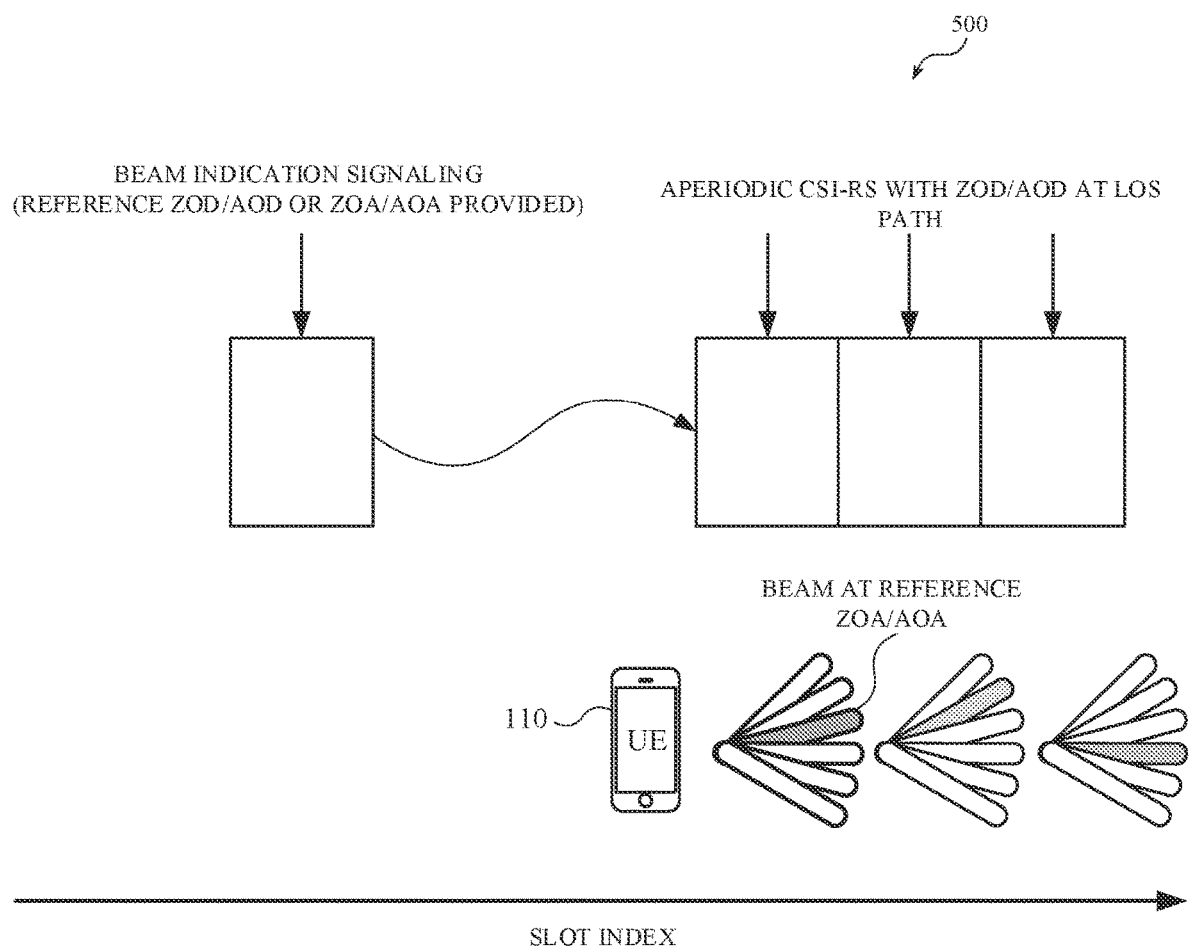
FIG. 5 is a diagram of an example of providing a beam indication according to one or more implementations described herein.

FIG. 5 is a diagram of an example 500 of providing a beam indication according to one or more implementations described herein. As shown, base station 122 may provide UE 110 with a beam indication based on a DL RS (see, for example, operations 310-350 of FIG. 3). The beam indication may include direction information and/or other characteristics of a beam and corresponding LOS path based on the PMI reported by UE 110 (see, for example, operations 310-350 of FIG. 3). The beam indication may be provided based on a downlink RS with the Tx beam at the corresponding AoD and ZoD. To facilitate UE beam refinement, base station 122 may indicate the reference AoD/ZoD and/or AoA/ZoA in the beam indication signal. In response to the beam indication, UE 110 may perform a beam refinement procedure based on the beam indication and may thereafter use the beam to communicate with base station 122. In some implementations, the beam indication signaling from base station 122 may trigger an aperiodic CSI-RS resource set to speed up beam refinement by UE 110. As shown, the beam indication signal, which may include a reference ZoD/AoD and/or ZoA/AoA, may correspond to a particular slot of a slot index, and the aperiodic CSI-RS with ZoD/AoD at the LOS path may correspond to different slots of the slot index. The UE may receive an aperiodic CSI-RS via a UE beam refinement operation to identify a best or preferred UE beam based on the reference ZoA/AoA (e.g., UE 110 may measure different CSI-RS symbols with different UE beams around the reference ZoA/AoA, and may select the UE beam which leads to the best beam quality.

Figure 6:
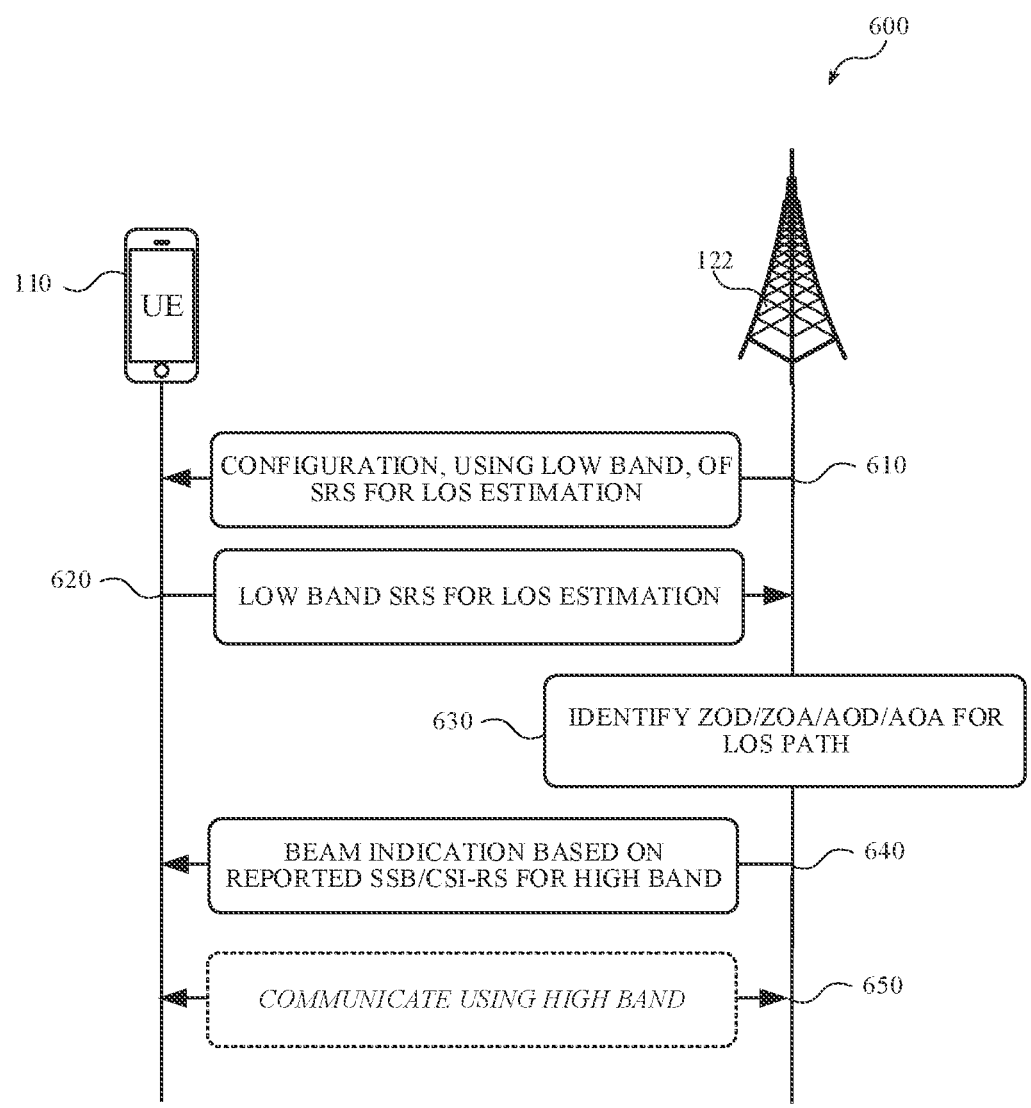
FIG. 6 is a diagram of an example of a process for enhanced beam selection based on sounding reference signal (SRS) according to one or more implementations described herein.

FIG. 6 is a diagram of an example of a process for enhanced beam selection based on sounding reference signal (SRS) according to one or more implementations described herein. Process 600 may be implemented by UE 110 and base station 122. In some implementations, some or all of process 600 may be performed by one or more other systems or devices, including one or more of the devices of FIG. 1. Additionally, process 600 may include one or more fewer, additional, differently ordered and/or arranged operations than those shown in FIG. 6. In some implementations, some or all of the operations of process 600 may be performed independently, successively, simultaneously, etc., of one or more of the other operations of process 600. As such, the techniques described herein are not limited to a number, sequence, arrangement, timing, etc., of the operations or process depicted in FIG. 6.

As show, process 600 may include base station 122 using low band communications to send configuration information to UE 110 regarding SRS for LOS estimation (at 610). The configuration information may be or include a request or trigger for UE 110 to send an UL SRS to baes station 122. In some implementations, the configuration information may include one or more of the following enumerated parameters, which may pertain to an IE, including a parameter for "los".usage ENUMERATED {beamManagement, codebook, nonCodebook, antennaSwitching, los}, Additionally, or alternatively, the SRS may be an SRS based on a corresponding codebook. In some implementations, to estimate an LoS status for multiple TRPs, base station 122 may configure multiple SRS resources or resource sets, where each resource or resource set is used for one TRP. In some implementations, the configuration of SRS for LOS detection may include up to N (e.g., where N=1) resource sets per bandwidth part (BWP)/CC. Additionally, or alternatively, each resource set, up to K resources (e.g., where K=1), may be configured. Additionally, or alternatively, for each resource, a bandwidth may be no less than N_min_RB (e.g., wherein RB is resource blocks and N_min_RB=4) and/or repetition factors (e.g., a transmission comb or transmissionComb) may be no less than a specified N_min_comb. A transmission comb may include a distributed, comb-shaped transmission with equally-spaced outputs allocated over a bandwidth. Alternatively, a total number of resource elements (REs) for a SRS resource may be no less than N_min_RB*N_min_comb. Additionally, or alternatively, a minimal bandwidth may be counted per symbol, per resource, or across symbols per resource. Each resource may also, or alternatively, be transmitted based on 1 antenna port or maximum number of antenna ports reported by UE 110.

In accordance with the SRS configuration information, UE 110 may use low band communications to send an SRS to base station 122 for LOS estimation (block 620). Base station 122 may receive, process, measure, etc., the SRS to determine a LOS path, for high band communications between UE 110 and base station 122, based on the low band SRS (at 630). In some implementations, this may include base station 122 determining, based on the SRS, one or more of a ZoD, ZoA, AoD, and/or AoA for the LOS path. Base station 122 may also, or alternatively, send a beam indication to UE 110 based on the reported SSB/CSI-RS for high band communications (at 640). UE 110 and base station 122 may communicate with one another using high band communications based on the beam indication from base station 122 (at 650).

Additionally, base station 122 may provide UE 110 with a beam indication, which may include direction information and/or other characteristics of a beam and corresponding LOS path estimated from the SRS for LOS detection. The beam indication may be provided based on a downlink RS with the Tx beam at the corresponding AoD and ZoD. To facilitate UE beam refinement, base station 122 may indicate the reference AoD/ZoD and/or AoA/ZoA in the beam indication signal. In response to the beam indication, UE 110 may perform a beam refinement procedure based on the beam indication and may thereafter use the beam to communicate with base station 122. In some implementations, the beam indication signaling from base station 122 may trigger an aperiodic CSI-RS resource set to speed up beam refinement by UE 110. As shown, the beam indication signal, which may include a reference ZoD/AoD and/or ZoA/AoA, may correspond to a particular slot of a slot index, and the aperiodic CSI-RS with ZoD/AoD at the LOS path may correspond to different slots of the slot index. The UE may receive an aperiodic CSI-RS with a UE beam refinement operation to identify the best or preferred UE beam based on the reference ZoA/AoA (e.g., UE 110 may measure different CSI-RS symbols with different UE beams around the reference ZoA/AoA, and may select the UE beam which leads to the best beam quality).

Figure 7:
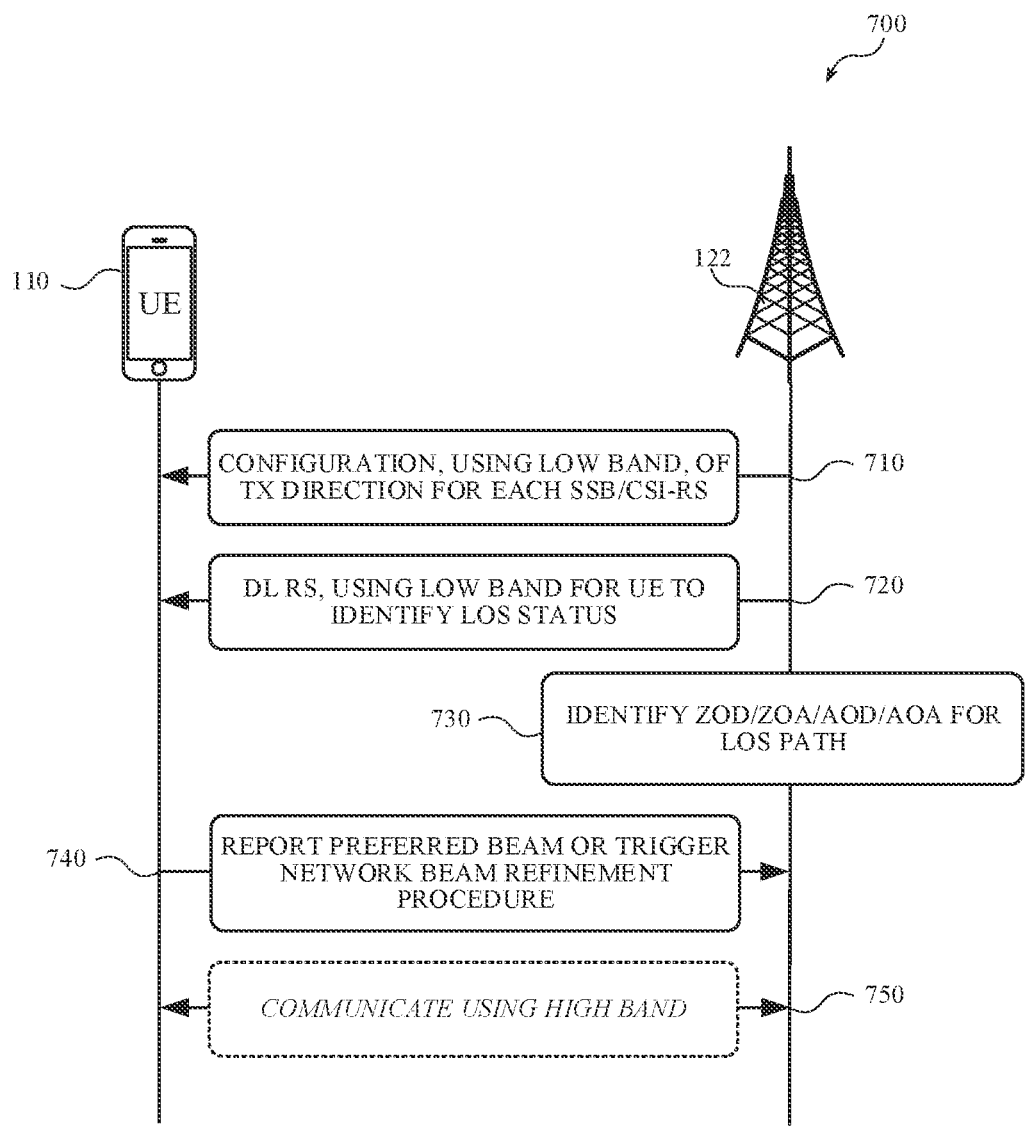
FIG. 7 is a diagram of an example of a process for enhanced beam selection based on transmission (Tx) direction information and line-of-sight (LOS) detection.

FIG. 7 is a diagram of an example of a process 700 for enhanced beam selection based on Tx direction information and LOS detection. Process 700 may be implemented by UE 110 and base station 122. In some implementations, some or all of process 700 may be performed by one or more other systems or devices, including one or more of the devices of FIG. 1. Additionally, process 700 may include one or more fewer, additional, differently ordered and/or arranged operations than those shown in FIG. 7. In some implementations, some or all of the operations of process 700 may be performed independently, successively, simultaneously, etc., of one or more of the other operations of process 700. As such, the techniques described herein are not limited to a number, sequence, arrangement, timing, etc., of the operations or process depicted in FIG. 7.

As shown, process 700 may include base station 122 communicating, to UE 110, configuration information of a Tx direction for each SSB/CSI-RS (at 710). The Tx direction information may include a ZoD and AoD for each beam carrying SSB/CSI-RS. In some implementations, Tx direction information for each SSB/CSI-RS may be provided by system information block (SIB) or dedicated RRC signaling. In some implementations, base station 122 may provide the ZoD and AoD for each SSB. In some implementations, a beam codebook may be predefined and base station 122 may indicate, to UE 110, the beam for each SSB/CSI-RS based on a PMI selected from the beam codebook. In some implementations, base station 122 may provide a beamforming weight matrix for each SSB. The weight matrix may be provided with an Nt*1 vector, where Nt may indicate a total number of Tx antenna. Alternatively, the weight matrix may be provided with a 1*N matrix A and an M*1 matrix B, where N may indicate a number of Tx antennas in a horizontal plane; M may indicate a number of Tx antennas in a vertical plane; and the weight matrix is a normalized Kronecker product for matrix A and B. In some implementations, base station 122 may also provide information, to UE 110, describing or indicating whether TRPs for low band and high band communications are co-located or not. In some implementations, a new parameter-assisted reference-CC index for beam measurement and selection may be provided, which may inform UE 110 about the CC index to assist the beam measurement and selection process.

Base station 122 may also, or alternatively, use a low band to communicate DL RSs for UE to identify a LOS status between UE 110 and base station 122 (at 720). UE 110 may use the configuration information and the DL RSs to determine, using a low band, a LOS status between UE 110 and base station 122, which may include UE 110 identifying or determining characteristics of the LOS path (e.g., a ZoD, ZoA, AoD, and/or AoA (at 730). UE 110 may also, or alternatively, measure and compare the beams from base station 122 and may determine a preferred beam from among the measured beams. The preferred beam may be the beam with a LOS status and/or a beam with a highest level of measured quality, CSI, etc., from among beams with a LOS status. UE 110 may also report, or otherwise communicate, the preferred beam to base station 122 (at 740). Additionally, or alternatively, UE 110 may send to base station 122, information to trigger a network beam refinement procedure (at 740). Upon resolving/refining a LOS beam, UE 110, and base station 122 may use the characteristics of the LOS beam to communicate using high band communications.

Figure 8:
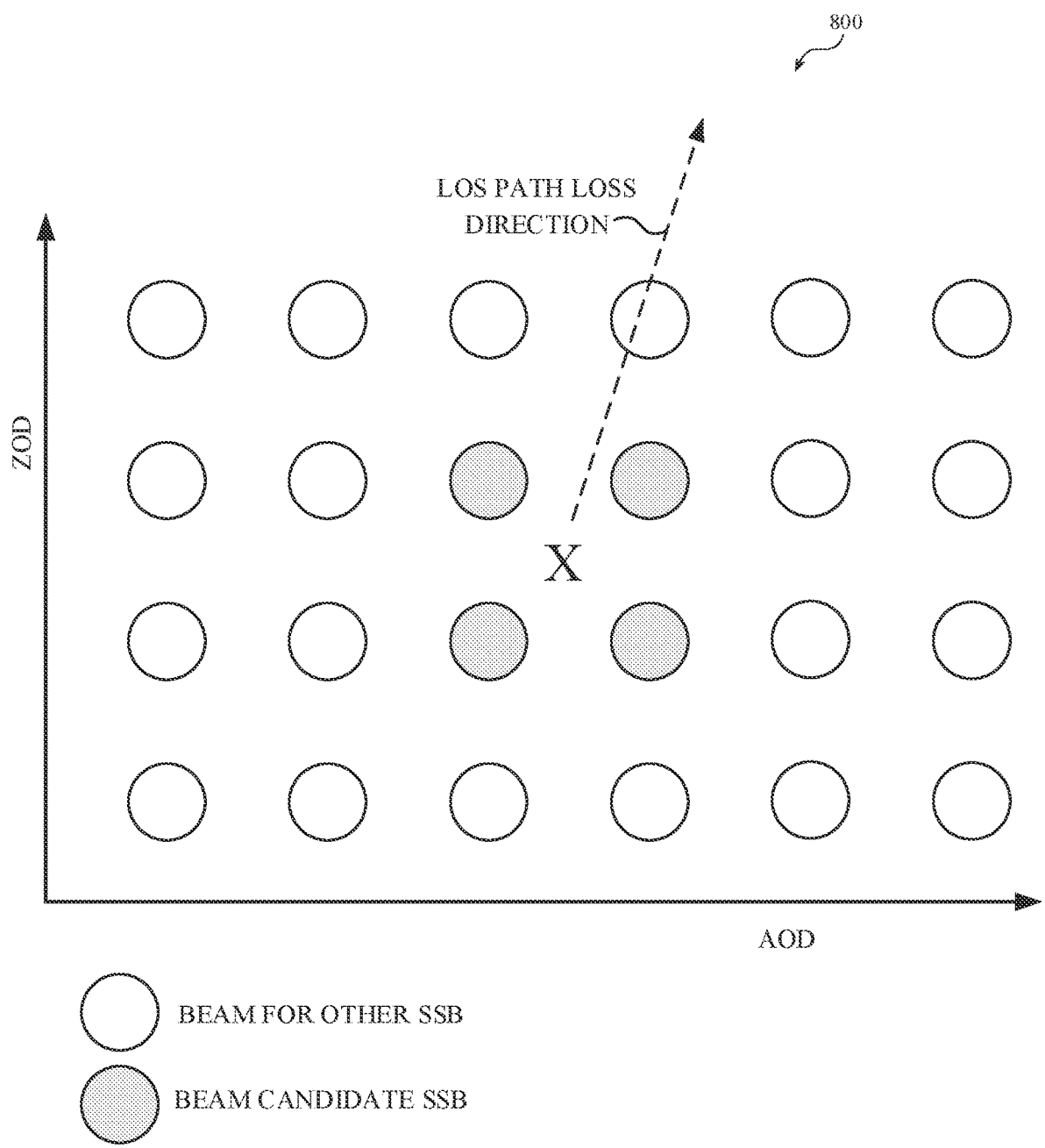
FIG. 8 is a diagram of an example of identifying candidate synchronization signal block (SSBs) according to one or more implementations described herein.

FIG. 8 is a diagram of an example 800 of identifying candidate SSBs according to one or more implementations described herein. After UE 100 detects a LOS path and LOS direction, UE 110 may identify or determine the corresponding (e.g., best SSBs). As shown in FIG. 8, in some scenarios this may include multiple candidate SSBs or "beam candidate SSBs". When multiple SSBs are identified (e.g., the LOS direction is among several SSBs), UE 110 may start to measure the L1-RSRP for these SSBs and identify the best SSB. Upon doing so, UE 110 may report the best SSB index to base station 122 by MAC CE or UL control information (UCI). Alternatively, UE 110 may report the indexes for the candidate SSBs to base station 122, and base station 122 may trigger aperiodic CSI-RS resource set for network beam refinement. Beam refinement, as described herein, may include repeating one or more operations of the beam measurement and selection process to obtain a more refined or high quality assessment of quality of beams between UE 110 and base station 122.

In some implementations, for LOS status detection and indication, UE 110 may instead report a power delay profile measured from a DL RS transmitted from low band by base station 112, and base station 122 may determine the LOS status based on the reported power delay profile. A power delay profile may include the power and delay for each tap for time domain channel. A tap, as described herein, may include the power from multiple paths with the same delay.

In some implementations, for LOS status detection and indication, UE 110 may report the PMI additionally so that base station 122 may calculate the direction of the corresponding LOS path. In such scenarios, the PMI and PDP may be reported from a single signaling or separate signaling. Additionally, or alternatively, the PMI and power delay profile (PDP) may be measured from the same DL RS or different DL RSs. In some implementations, for LOS status detection and indication, UE 110 may report the timing measured at the UE side, or the propagation delay measured at UE side, and base station 122 may identify a potential spatial consistency for some UEs 110 and determine the beam for the group of UEs 110.

Figure 9:
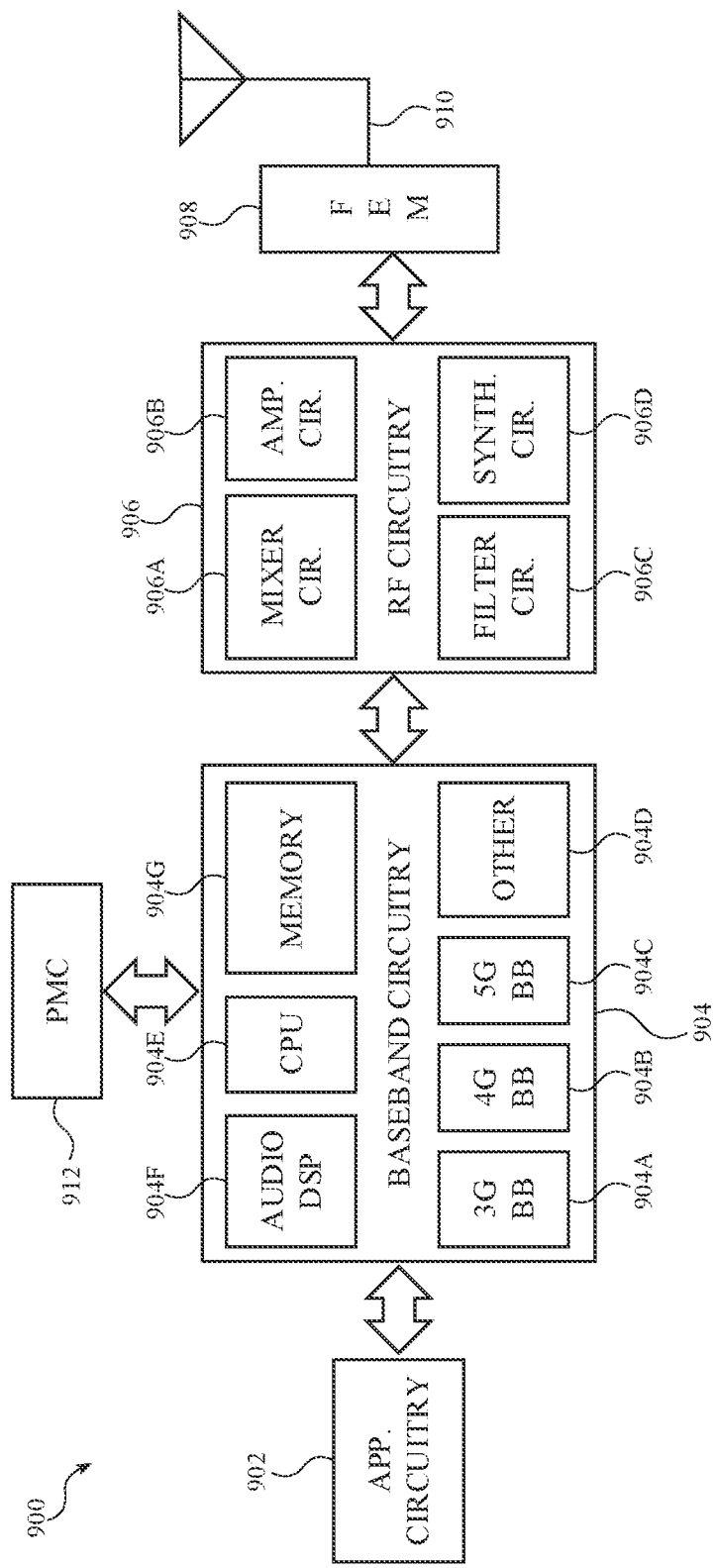
FIG. 9 is a diagram of an example of components of a device according to one or more implementations described herein.

FIG. 9 is a diagram of an example of components of a device according to one or more implementations described herein. In some implementations, the device 900 can include application circuitry 902, baseband circuitry 904, RF circuitry 906, front-end module (FEM) circuitry 908, one or more antennas 910, and power management circuitry (PMC) 912 coupled together at least as shown. The components of the illustrated device 900 can be included in a UE or a RAN node. In some implementations, the device 900 can include fewer elements (e.g., a RAN node may not utilize application circuitry 902, and instead include a processor/controller to process IP data received from a CN such as 5GC 130 or an Evolved Packet Core (EPC)). In some implementations, the device 900 can include additional elements such as, for example, memory/storage, display, camera, sensor) including one or more temperature sensors, such as a single temperature sensor, a plurality of temperature sensors at different locations in device 900, etc.), or input/output (I/O) interface. In other implementations, the components described below can be included in more than one device (e.g., said circuitries can be separately included in more than one device for Cloud-RAN (C-RAN) implementations).

The application circuitry 902 can include one or more application processors. For example, the application circuitry 902 can include circuitry such as, but not limited to, one or more single-core or multi-core processors. The processor)s(can include any combination of general-purpose processors and dedicated processors) e.g., graphics processors, application processors, etc. The processors can be coupled with or can include memory/storage and can be configured to execute instructions stored in the memory/storage to enable various applications or operating systems to run on the device 900. In some implementations, processors of application circuitry 902 can process IP data packets received from an EPC.

The baseband circuitry 904 can include circuitry such as, but not limited to, one or more single-core or multi-core processors. The baseband circuitry 904 can include one or more baseband processors or control logic to process baseband signals received from a receive signal path of the RF circuitry 906 and to generate baseband signals for a transmit signal path of the RF circuitry 906. Baseband circuitry 904 can interface with the application circuitry 902 for generation and processing of the baseband signals and for controlling operations of the RF circuitry 906. For example, in some implementations, the baseband circuitry 904 can include a 3G baseband processor 904A, a 4G baseband processor 904B, a 5G baseband processor 904C, or other baseband processor(s) 904D for other existing generations, generations in development or to be developed in the future (e.g., 2G, 6G, etc.). The baseband circuitry 904 (e.g., one or more of baseband processors 904A-D) can handle various radio control functions that enable communication with one or more radio networks via the RF circuitry 906. In other implementations, some or all of the functionality of baseband processors 904A-D can be included in modules stored in the memory 904G and executed via a Central Processing Unit (CPU) 904E. The radio control functions can include, but are not limited to, signal modulation/demodulation, encoding/decoding, radio frequency shifting, etc. In some implementations, modulation/demodulation circuitry of the baseband circuitry 904 can include Fast-Fourier Transform (FFT), precoding, or constellation mapping/de-mapping functionality. In some implementations, encoding/decoding circuitry of the baseband circuitry 904 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, the baseband circuitry 904 can include one or more audio digital signal processor(s) (DSP) 904F. The audio DSPs 904F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 904 and the application circuitry 902 can be implemented together such as, for example, on a system on a chip)SOC(.

In some implementations, the baseband circuitry 904 can provide for communication compatible with one or more radio technologies. For example, in some implementations, the baseband circuitry 904 can support communication with a NG-RAN, an evolved universal terrestrial radio access network)EUTRAN(or other wireless metropolitan area networks)WMAN(a wireless local area network (WLAN), a wireless personal area network (WPAN), etc. Implementations in which the baseband circuitry 904 is configured to support radio communications of more than one wireless protocol can be referred to as multi-mode baseband circuitry.

RF circuitry 906 can enable communication with wireless networks using modulated electromagnetic radiation through a non-solid medium. In various implementations, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some implementations, the receive signal path of the RF circuitry 906 can include mixer circuitry 906A, amplifier circuitry 906B and filter circuitry 906C. In some implementations, the transmit signal path of the RF circuitry 906 can include filter circuitry 906C and mixer circuitry 906A. RF circuitry 906 can also include synthesizer circuitry 906D for synthesizing a frequency for use by the mixer circuitry 906A of the receive signal path and the transmit signal path. In some implementations, the mixer circuitry 906A of the receive signal path can be configured to down-convert RF signals received from the FEM circuitry 908 based on the synthesized frequency provided by synthesizer circuitry 906D. The amplifier circuitry 906B can be configured to amplify the down-converted signals and the filter circuitry 906C can be a low-pass filter (LPF) or band-pass filter (BPF) configured to remove unwanted signals from the down-converted signals to generate output baseband signals. Output baseband signals can be provided to the baseband circuitry 904 for further processing. In some implementations, the output baseband signals can be zero-frequency baseband signals, although this is not a requirement. In some implementations, mixer circuitry 906A of the receive signal path can comprise passive mixers, although the scope of the implementations is not limited in this respect.

In some implementations, the mixer circuitry 906A of the transmit signal path can be configured to up-convert input baseband signals based on the synthesized frequency provided by the synthesizer circuitry 906D to generate RF output signals for the FEM circuitry 908. The baseband signals can be provided by the baseband circuitry 904 and can be filtered by filter circuitry 906C.

In some implementations, the mixer circuitry 906A of the receive signal path and the mixer circuitry 906A of the transmit signal path can include two or more mixers and can be arranged for quadrature down conversion and up conversion, respectively. In some implementations, the mixer circuitry 906A of the receive signal path and the mixer circuitry 906A of the transmit signal path can include two or more mixers and can be arranged for image rejection (e.g., Hartley image rejection). In some implementations, the mixer circuitry 906A of the receive signal path and the mixer circuitry 906A can be arranged for direct down conversion and direct up conversion, respectively. In some implementations, the mixer circuitry 906A of the receive signal path and the mixer circuitry 906A of the transmit signal path can be configured for super-heterodyne operation.

In some implementations, the output baseband signals and the input baseband signals can be analog baseband signals, although the scope of the implementations is not limited in this respect. In some alternate implementations, the output baseband signals and the input baseband signals can be digital baseband signals. In these alternate implementations, the RF circuitry 906 can include analog-to-digital converter (ADC) and digital-to-analog converter (DAC) circuitry and the baseband circuitry 904 can include a digital baseband interface to communicate with the RF circuitry 906.

In some dual-mode implementations, a separate radio IC circuitry can be provided for processing signals for each spectrum, although the scope of the implementations is not limited in this respect.

In some implementations, the synthesizer circuitry 906D can be a fractional-N synthesizer or a fractional N/N+1 synthesizer, although the scope of the implementations is not limited in this respect as other types of frequency synthesizers can be suitable. For example, synthesizer circuitry 906D can be a delta-sigma synthesizer, a frequency multiplier, or a synthesizer comprising a phase-locked loop with a frequency divider.

The synthesizer circuitry 906D can be configured to synthesize an output frequency for use by the mixer circuitry 906A of the RF circuitry 906 based on a frequency input and a divider control input. In some implementations, the synthesizer circuitry 906D can be a fractional N/N+1 synthesizer.

In some implementations, frequency input can be provided by a voltage controlled oscillator (VCO), although that is not a requirement. Divider control input can be provided by either the baseband circuitry 904 or the applications circuitry 902 depending on the desired output frequency. In some implementations, a divider control input (e.g., N) can be determined from a look-up table based on a channel indicated by the applications circuitry 902.

Synthesizer circuitry 906D of the RF circuitry 906 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 906D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 906 can include an IQ/polar converter.

FEM circuitry 908 can include a receive signal path which can include circuitry configured to operate on RF signals received from one or more antennas 910, amplify the received signals and provide the amplified versions of the received signals to the RF circuitry 906 for further processing. FEM circuitry 908 can also include a transmit signal path which can include circuitry configured to amplify signals for transmission provided by the RF circuitry 906 for transmission by one or more of the one or more antennas 910. In various implementations, the amplification through the transmit or receive signal paths can be done solely in the RF circuitry 906, solely in the FEM circuitry 908, or in both the RF circuitry 906 and the FEM circuitry 908.

In some implementations, the FEM circuitry 908 can include a Tx/Rx switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 906). The transmit signal path of the FEM circuitry 908 can include a power amplifier (PA) to amplify input RF signals (e.g., provided by RF circuitry 906), and one or more filters to generate RF signals for subsequent transmission (e.g., by one or more of the one or more antennas 910).

In some implementations, the PMC 912 can manage power provided to the baseband circuitry 904. In particular, the PMC 912 can control power-source selection, voltage scaling, battery charging, or DC-to-DC conversion. The PMC 912 can often be included when the device 900 is capable of being powered by a battery, for example, when the device is included in a UE. The PMC 912 can increase the power conversion efficiency while providing desirable implementation size and heat dissipation characteristics.

While FIG. 9 shows the PMC 912 coupled only with the baseband circuitry 904. However, in other implementations, the PMC 912 may be additionally or alternatively coupled with, and perform similar power management operations for, other components such as, but not limited to, application circuitry 902, RF circuitry 906, or FEM circuitry 908.

In some implementations, the PMC 912 can control, or otherwise be part of, various power saving mechanisms of the device 900. For example, if the device 900 is in an RRC_Connected state, where it is still connected to the RAN node as it expects to receive traffic shortly, then it can enter a state known as Discontinuous Reception Mode (DRX) after a period of inactivity. During this state, the device 900 can power down for brief intervals of time and thus save power.

If there is no data traffic activity for an extended period of time, then the device 900 can transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 902 and processors of the baseband circuitry 904 can be used to execute elements of one or more instances of a protocol stack. For example, processors of the baseband circuitry 904, alone or in combination, can be used execute Layer 3, Layer 2, or Layer 1 functionality, while processors of the baseband circuitry 904 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 10:
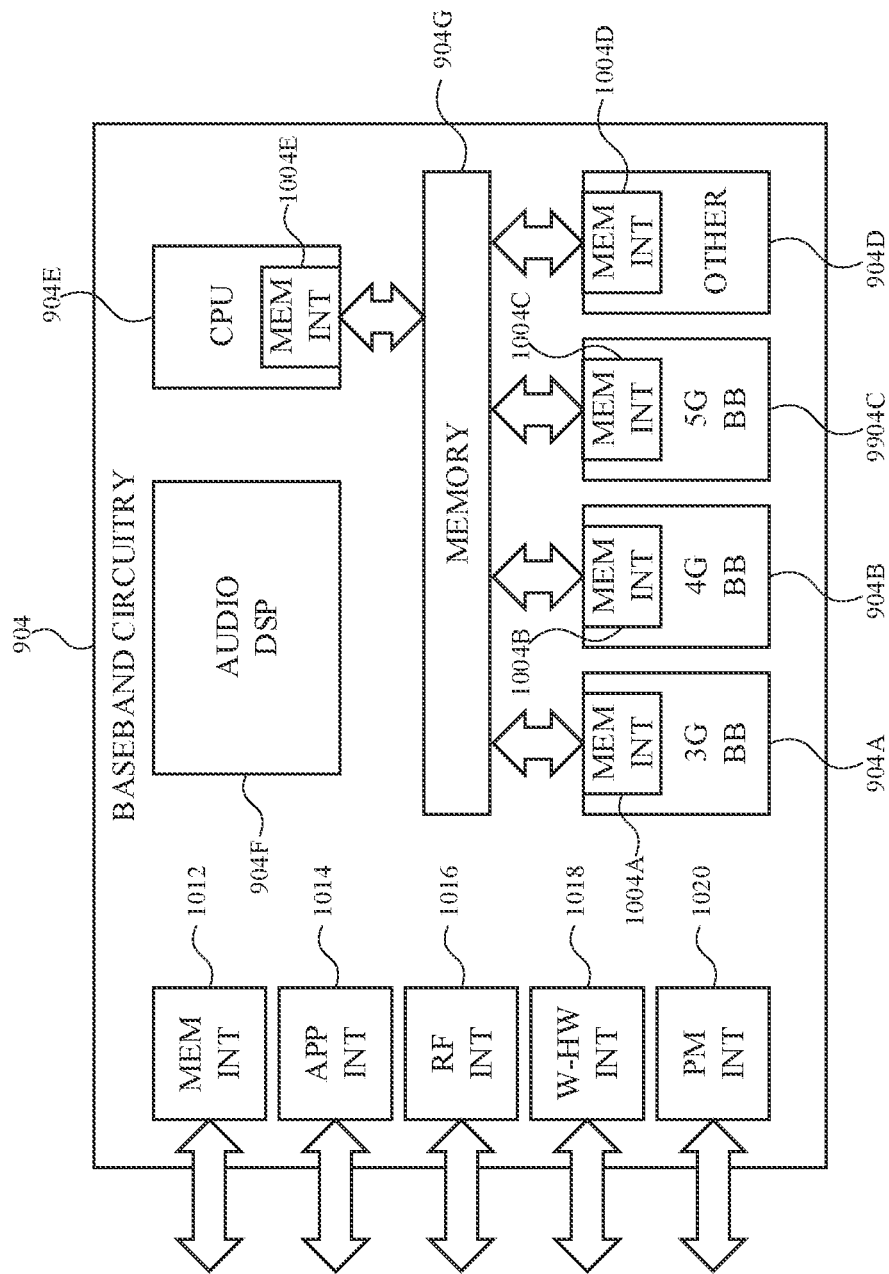
FIG. 10 is a diagram of example interfaces of baseband circuitry according to one or more implementations described herein.

FIG. 10 is a diagram of example interfaces of baseband circuitry according to one or more implementations described herein. As discussed above, the baseband circuitry 904 of FIG. 9 can comprise processors 904A-904E and a memory 904G utilized by said processors. Each of the processors 904A-904E can include a memory interface, 1004A-1004E, respectively, to send/receive data to/from the memory 904G.

The baseband circuitry 904 can further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 109 (e.g., an interface to send/receive power or control signals to/from the PMC 912).

Figure 11:
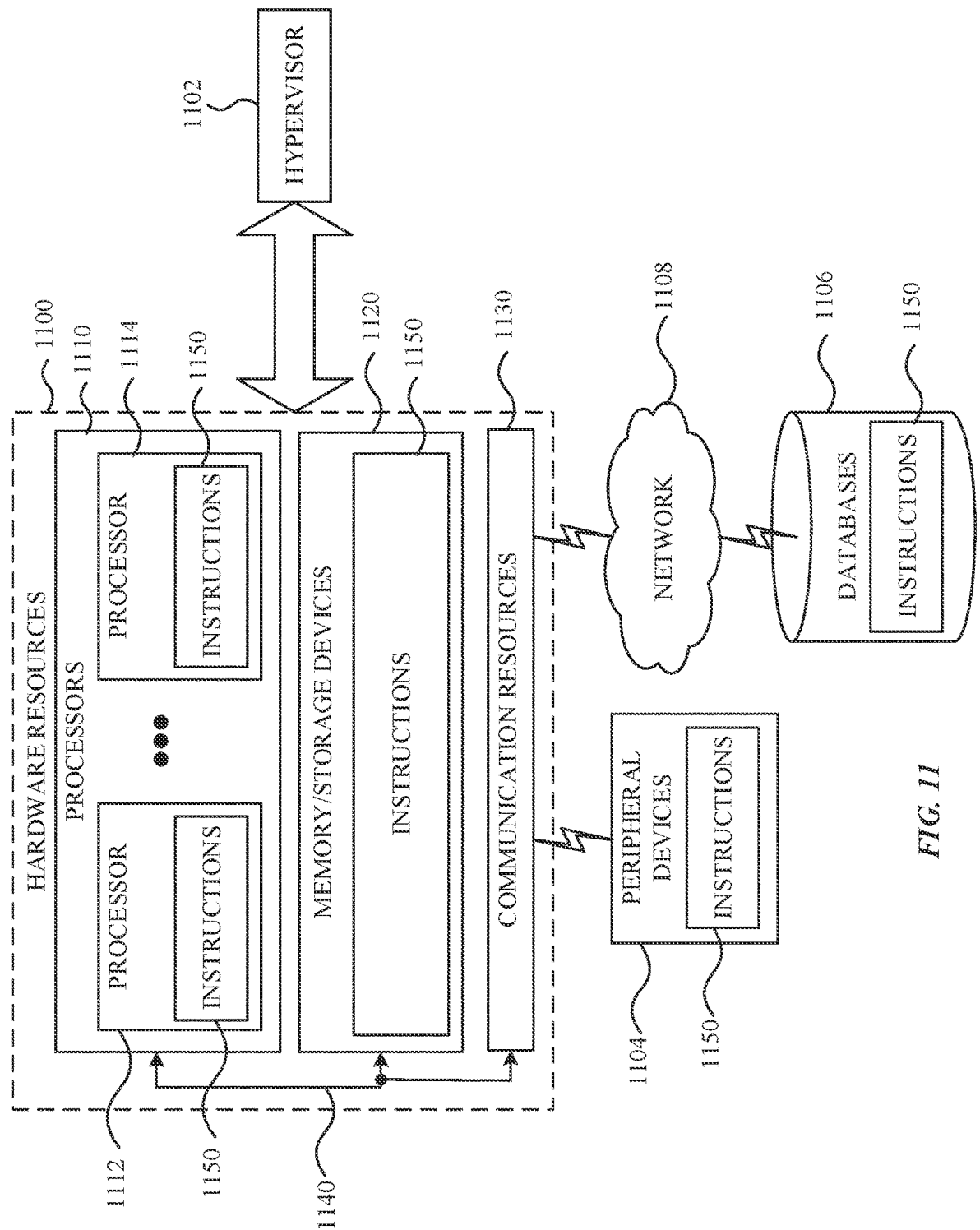
FIG. 11 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a baseband processor of a user equipment (UE) may comprise: one or more processors configured to: receive, from a base station, a downlink (DL) reference signal (RS) via a first frequency range; determine, based on the DL RS, a line-of-sight (LOS) status between the UE and the base station; provide, to the base station, the LOS status via the first frequency range; receive, from the base station and in response to the LOS status, a beam indication for communicating with the base station via a second frequency range; and communicate with the base station via the second frequency range.

In example 2, which may also include one or more of the examples described herein, the first frequency range is a low band frequency range and the second frequency range is a high band frequency range. In example 3, which may also include one or more of the examples described herein, the LOS status is configured to indicate LOS status for a beam, corresponding to the DL RS, between the UE and the base station. In example 4, which may also include one or more of the examples described herein, a configuration of a LOS status report is communicated via an information element (IE) comprising a LOS parameter.

In example 5, which may also include one or more of the examples described herein, the LOS status is communicated via channel state information (CSI). In example 6, which may also include one or more of the examples described herein, the beam indication comprises a LOS beam path comprising an azimuth angle of departure (AoD), an azimuth angle of arrival (AoA), a zenith angle of departure (ZoD), and a zenith angle of arrival (ZoA). In example 7, which may also include one or more of the examples described herein, the one or more processors is further configured to: determine a precoder matrix indicator (PMI) corresponding to the DL RS; and provide the PMI to the base station. In example 8, which may also include one or more of the examples described herein, the beam indication is based on the PMI from the UE.

In example 9, which may also include one or more of the examples described herein, a baseband processor of a user equipment (UE) may comprise: one or more processors configured to: receive, from a base station and via a first frequency band, configuration information for a sounding reference signal (SRS); communicate, to the base station and via the first frequency band, a SRS based on the configuration information; receive, from the base station and in response to the SRS, a beam indication for a line-of-sight (LOS) beam; and using the beam indication to communicate with the base station using a second frequency band.

In example 10, which may also include one or more of the examples described herein, the first frequency range is a low band frequency range and the second frequency range is a high band frequency range. In example 11, which may also include one or more of the examples described herein, the beam indication comprises a LOS beam path comprising an azimuth angle of departure (AoD), an azimuth angle of arrival (AoA), a zenith angle of departure (ZoD), and a zenith angle of arrival (ZoA). In example 12, which may also include one or more of the examples described herein, the configuration information comprises an indication of a codebook. In example 13, which may also include one or more of the examples described herein, the SRS is configured to correspond to a component carrier between the UE and the base station.

In example 14, which may also include one or more of the examples described herein, a baseband processor of a user equipment (UE) may comprise: one or more processors configured to: receive, from a base station via a first frequency band, transmission direction information for a reference signal from the base station; receive, from the base station via the first frequency band, the reference signal corresponding to the transmission direction information; determine, based on the transmission direction information and the reference signal, a line-of-sight (LOS) path between the UE and the base station; communicate, to the base station and via the first frequency band, a beam corresponding to the LOS path; and communicate, with the base station via a second frequency band, using the beam of the LOS path.

In example 15, which may also include one or more of the examples described herein, the first frequency range is a low band frequency range and the second frequency range is a high band frequency range. In example 16, which may also include one or more of the examples described herein, the UE receives zenith angle of departure (ZoD) and a zenith angle of arrival (ZoA) information with system synchronizations blocks (SSBs) from the base station. In example 17, which may also include one or more of the examples described herein, the beam is indicated, by the base station, based on a beam codebook and corresponding precoder matrix indicator (PMI). In example 18, which may also include one or more of the examples described herein, the UE is configured to receive a beamforming weigh matrix corresponding to the beam. In example 19, which may also include one or more of the examples described herein, the beam communicated by the UE is a preferred beam, determined from a plurality of candidate beams from the base station.

In example 20, which may also include one or more of the examples described herein, a baseband processor of a base station may comprise: one or more processors configured to: communicate, to a user equipment (UE), a downlink (DL) reference signal (RS) via a first frequency range; receive, from the UE, in response to the DL SL, and via the first frequency range, a line-of-sight (LOS) status between the UE and the base station; determine, based on the line-of-sight (LOS) status a beam indication for communicating with the UE via a second frequency range; provide, to the UE, the beam indication via the first frequency range; and communicate, based on the beam indication, with the UE via the second frequency range.

In example 21, which may also include one or more of the examples described herein, a baseband processor of a base station may comprise: one or more processors configured to: communicate, to a user equipment (UE) via a first frequency band, configuration information for a sounding reference signal (SRS); receive, from the UE and via the first frequency band, a SRS based on the configuration information; communicate, to the UE and in response to the SRS, a beam indication for a line-of-sight (LOS) beam; and communicate, with the UE and based on the beam indication, using a second frequency band.

In example 22, which may also include one or more of the examples described herein, a baseband processor of a base station may comprise: one or more processors configured to: communicate, to a user equipment (UE) via a first frequency band, transmission direction information for a reference signal from the base station; communicate, to the UE via the first frequency band, the reference signal corresponding to the transmission direction information; receive, from the UE via the first frequency band, a beam corresponding to a line-of-sight (LOS) path between the UE and the base station; and communicate, with the UE via a second frequency band, using the beam of the LOS path.

In example 23, which may also include one or more of the examples described herein, a method, performed by a user equipment (UE), may comprise: receiving, from a base station, a downlink (DL) reference signal (RS) via a first frequency range; determining, based on the DL RS, a line-of-sight (LOS) status between the UE and the base station; providing, to the base station, the LOS status via the first frequency range; receiving, from the base station and in response to the LOS status, a beam indication for communicating with the base station via a second frequency range; and communicating with the base station via the second frequency range.

In example 24, which may also include one or more of the examples described herein, a method, performed by a base station may comprise: communicating, to a user equipment (UE), a downlink (DL) reference signal (RS) via a first frequency range; receiving, from the UE, in response to the DL SL, and via the first frequency range, a line-of-sight (LOS) status between the UE and the base station; determining, based on the line-of-sight (LOS) status a beam indication for communicating with the UE via a second frequency range; providing, to the UE, the beam indication via the first frequency range; and communicating, based on the beam indication, with the UE via the second frequency range.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A baseband processor for a User Equipment (UE), comprising:
   one or more memories;
   one or more processors coupled to the one or more memories, and when executing instructions stored in the one or more memories, configured to cause the UE to:
   receive from a base station, in a first frequency range, configuration information for a sounding reference signal (SRS);
   send to the base station, in the first frequency range, the SRS based on the configuration information;
   receive from the base station, a beam indication generated based on the SRS and identifying a line-of-sight (LOS) beam between the UE and the base station for replaced by communicating in a second frequency range different from the first frequency range; and
   communicate with the base station in the second frequency range using the LOS beam identified by the beam indication.

2. The baseband processor of claim 1, wherein the first frequency range is a low band frequency range and the second frequency range is a high band frequency range with a frequency spectrum greater than that of the first frequency range.

3. The baseband processor of claim 1, wherein the one or more processors are further configured to:
perform a UE beam refinement for the LOS beam.

4. The baseband processor of claim 3, wherein the receiving of the beam indication triggers an aperiodic channel state information reference signal (CSI-RS) to facilitate the UE beam refinement.

5. The baseband processor of claim 1, wherein an additional SRS is configured for identifying a LOS beam of an additional transmission reception point (TRP).

6. The baseband processor of claim 1, wherein the configuration information comprises an indication of a usage for uplink LOS.

7. The baseband processor of claim 1, wherein the configuration information comprises an indication of a usage for codebook.

8. The baseband processor of claim 1, wherein the SRS corresponds to a component carrier.

9. The baseband processor of claim 1, wherein the beam indication comprises a LOS beam path comprising an azimuth angle of departure (AoD), an azimuth angle of arrival (AoA), a zenith angle of departure (ZoD), or a zenith angle of arrival (ZoA).

10. A base station, comprising:
a memory;
a processor coupled to the memory, and when executing instructions stored in the memory, configured to cause the base station to:
communicate, with a user equipment (UE), a reference signal in a first frequency range;
receive, from the UE via the first frequency range, a line-of-sight (LOS) status report to indicate a LOS status of a beam between the UE and the base station;
communicate, with the UE, a beam indication for communicating with the UE in a second frequency range different from the first frequency range, wherein the beam indication identifies, based on the reference signal, a LOS beam between the UE and the base station; and
communicate with the UE in the second frequency range using the LOS beam identified by the beam indication.

11. The base station of claim 10, wherein the first frequency range is a low band frequency range and the second frequency range is a high band frequency range with a frequency spectrum greater than that of the first frequency range.

12. The base station of claim 10,
wherein the reference signal is a downlink (DL) reference signal transmitted to the UE,
wherein the LOS status report is based on the DL reference signal, and
wherein the LOS status report is used to determine the LOS beam.

13. The base station of claim 10,
wherein the LOS status report includes a precoder matrix indicator (PMI) corresponding to the reference signal, and
wherein the beam indication is based on the PMI.

14. The base station of claim 10, wherein the beam indication is transmitted from the base station to the UE.

15. The base station of claim 10, wherein the the LOS status report is configured via an information element (IE) comprising a LOS parameter.

16. The base station of claim 10, wherein the LOS status report is transmitted via channel state information (CSI).

17. A method, comprising:
communicate, from a base station to a user equipment (UE) in a first frequency range, a downlink reference signal;
communicate, between the UE and the base station in the first frequency range, a beam indication that identifies, based on the downlink reference signal, a line-of-sight (LOS) beam for communicating between the UE and the base station in a second frequency range; and
communicate between the user equipment (UE) and the base station in the second frequency range using the LOS beam identified by the beam indication; and
wherein the first frequency range is a low band frequency range and the second frequency range is a high band frequency range with a frequency spectrum greater than that of the first frequency range.

18. The method of claim 17, further comprising:
wherein the beam indication is communicated from the UE to the base station, and
wherein the beam indication triggers a network beam refinement procedure prior to communicating in the second frequency range using the LOS beam.

19. The method of claim 17, wherein the beam indication is communicated from the base station and triggers an aperiodic channel state information reference signal (CSI-RS) to facilitate a UE beam refinement.

20. The method of claim 17, wherein the beam indication comprises a LOS beam path comprising an azimuth angle of departure (AoD), an azimuth angle of arrival (AoA), a zenith angle of departure (ZoD), or a zenith angle of arrival (ZoA).

* * * * *